US008992880B2

(12) United States Patent
Terayama et al.

(10) Patent No.: US 8,992,880 B2
(45) Date of Patent: Mar. 31, 2015

(54) METHOD OF MANUFACTURING ONION-LIKE CARBON

(75) Inventors: Nobuyuki Terayama, Kobe (JP); Nobuo Ohmae, Itami (JP)

(73) Assignees: Shinko Seiki Company, Limited, Kobe-Shi, Hyogo (JP); Nobuo Ohmae, Kobe-Shi, Hyogo (JP)

( * ) Notice: Subject to any disclaimer, the term of this patent is extended or adjusted under 35 U.S.C. 154(b) by 286 days.

(21) Appl. No.: 13/583,247

(22) PCT Filed: Jun. 6, 2011

(86) PCT No.: PCT/JP2011/062923
§ 371 (c)(1),
(2), (4) Date: Sep. 7, 2012

(87) PCT Pub. No.: WO2012/168993
PCT Pub. Date: Dec. 13, 2012

(65) Prior Publication Data
US 2013/0189178 A1 Jul. 25, 2013

(51) Int. Cl.
*C01B 31/02* (2006.01)
*B82Y 30/00* (2011.01)
*B82Y 40/00* (2011.01)

(52) U.S. Cl.
CPC .............. *C01B 31/02* (2013.01); *C01B 31/0293* (2013.01); *B82Y 30/00* (2013.01); *B82Y 40/00* (2013.01); *Y10S 977/773* (2013.01)
USPC ........................................ 423/447.3; 977/773

(58) Field of Classification Search
CPC ............................. C01B 31/02; C01B 31/0293
USPC ........................ 977/773; 423/445 B, DIG. 40
See application file for complete search history.

(56) References Cited

FOREIGN PATENT DOCUMENTS

| JP | 11-157818 | 6/1999 |
| JP | 2000-109310 | 4/2000 |
| JP | 2003-502266 A | 1/2003 |
| JP | 2006-199564 | 8/2006 |
| JP | 2010-202430 | 9/2010 |
| WO | WO2011/004609 A1 | 1/2011 |

OTHER PUBLICATIONS

Cabioc'h, T., et al. "Carbon onions formation by high-dose carbon ion implantation into copper and silver." Surface and Coatings Technology 128 (2000): 43-50.*
Gubarevich, Anna Valeryevna, et al. "Onion-like carbon deposition by plasma spraying of nanodiamonds." Carbon 41.13 (2003): 2601-2606.*
Noda, M., and M. Umeno. "Coating of DLC film by pulsed discharge plasma CVD." Diamond and related materials 14.11 (2005): 1791-1794.*
International Search Report from Corresponding International Application No. PCT/JP2011/062923 dated Aug. 1, 2011.

* cited by examiner

Primary Examiner — Richard M Rump
(74) Attorney, Agent, or Firm — Duane Morris LLP

(57) ABSTRACT

[Subject] Manufacturing onion-like carbon at a low cost.
[Means for Realizing Subject] According to the invention, DLC powder, which is hard carbon powder, is produced by plasma CVD using a hydrocarbon gas as a material gas, in a first step, i.e. a DLC powder producing processing step. Then, in a second step, i.e. a DLC-to-OLC converting processing step, the DLC powder is heated in a vacuum or in an inert gas atmosphere to thereby convert the DLC powder into OLC. Like this, according to the invention, since a hydrocarbon gas can be used as a starting material to manufacture OLC, OLC can be manufactured at a significantly low cost.

12 Claims, 7 Drawing Sheets

[TEM Picture of OLC]

[TEM Picture of DLC Powder]

METHOD OF MANUFACTURING ONION-LIKE CARBON

TECHNICAL FIELD

This invention relates to a method and system for manufacturing onion-like carbon (hereinafter referred to as OLC).

BACKGROUND ART

Since OLC is in the form of spherical particles having a diameter of from several nanometers to several tens of nanometers, exhibit a significantly low coefficient of friction both in air and in a vacuum and have good bearing resistance, they are expected to find applications as solid-state lubricants in particular. An example of methods for manufacturing such OLC is disclosed in, for example, Patent Literature 1. According to this technology, diamond nanopowder (hereinafter referred to as DNP) having a particle diameter of from 4 nm to 6 nm is produced by shock synthesis (detonation synthesis). This DNP is then hot-processed in an inert gas atmosphere at a temperature of from 1,600° C. to 1,800° C., which results in OLC.

LITERATURES OF BACKGROUND TECHNOLOGY

Patent Literature

Patent Literature 1: JP 11-157818A

SUMMARY OF INVENTION

Technical Problem

However, according to the above-stated technology, since the starting material ODN is expensive (i.e. around ¥5,000/g), the end product OLC is also expensive. Like this, the above-described prior technology has a problem in its cost.

Therefore, an object of the present invention is to provide a method and a system for manufacturing OLC at a lower cost.

Solution to Problem

To achieve this object, the present invention provides a first invention relating to a method of manufacturing OLC and a second invention relating to a system for manufacturing OLC. The first invention includes a DLC (diamond-like carbon) powder producing step for producing DLC powder by plasma CVD (plasma chemical vapor deposition) with a hydrocarbon gas used as a material gas therefor, and a converting step for heating the DLC powder produced in the DLC powder producing step in a vacuum or in an inert gas atmosphere to convert the DLC powder into onion-like carbon.

According to the first invention, OLC is manufactured (or synthesized) with a hydrocarbon gas used as a starting material. More specifically, in the DLC powder producing step, DLC powder, which is hard carbon powder, is produced by plasma CVD in which a hydrocarbon gas is used as a material gas. In the converting step, the DLC powder is heated in a vacuum or in an inert gas atmosphere, whereby the DLC powder is converted to OLC. In this manner, OLC is manufactured.

The useable hydrocarbon gases include acetylene ($C_2H_2$) gas, methane ($CH_4$) gas, ethylene ($C_2H_4$) gas, benzene ($C_6H_6$) gas etc., but, from a comprehensive viewpoint, with the DLC powder producing efficiency and cost, easiness of handling, easiness of procurement and safety of the material gas, etc. taken into consideration, acetylene gas is suitable.

The DLC powder producing step may include a plasma generating step, a gas introducing step and a temperature controlling step, which are described below. Specifically, in the plasma generating step, AC discharging power is supplied to a vacuum tank connected to a reference potential and to an open-mouthed container disposed in the vacuum tank, using the tank and the container as a pair of electrodes. This causes plasma to be generated in the vacuum tank with the container disposed therein. Then, in the gas introducing step, a hydrocarbon gas is introduced into the vacuum tank. The hydrocarbon gas is decomposed (dissociated) by the plasma, which causes DLC powder to be formed over the surfaces of the container, and over the inner wall of the container in particular. If the temperature within the container, or, in other words, the DLC powder producing temperature, is too high, or, more specifically, 300° C. or higher, hydrogen radicals and hydrogen ions, which are particles of hydrocarbon gas decomposed by the plasma, react with the DLC powder to gasify the DLC powder, which results in decrease of the DLC powder producing efficiency. In order to avoid such disadvantage, the temperature controlling step is employed in which the temperature within the container is controlled not to rise above 300° C.

In addition, in the gas introducing step, it is preferable for the hydrocarbon gas to be introduced into the vacuum tank through a gas introducing pipe insulated from the vacuum tank, with the hydrocarbon gas outlet port of the gas introducing pipe disposed preferably near the mouth of the container. This arrangement makes it possible for the hydrocarbon gas to be directly introduced into the container, resulting in improvement of the efficiency of production of the DLC powder on the inner wall of the container. Also, it is preferable for the DLC powder producing step to include a DC power supplying step in which DC power of positive potential referenced to the reference potential is supplied to the gas introducing pipe. By employing such DC power supplying step, the gas introducing pipe functions as an anode electrode, whereby electrons in the plasma are attracted into the gas introducing pipe. As a result, high-density discharge or what is called hollow-anode discharge is formed around the gas introducing pipe, or near the hydrocarbon gas outlet port of the gas introducing pipe in particular. The formation of the hollow-anode discharge improves the hydrocarbon gas decomposition efficiency, leading to further improvement of the efficiency of production of the DLC powder over the inner wall of the container.

The DC power supplying steps also contributes to the stabilization of the plasma. As described above, the plasma is generated by the application of AC discharging power, using the vacuum tank and the container as a pair of electrodes. In the DLC powder producing step, on the other hand, DLC powder adheres not only to the surface (inner wall) of the container but also to the surface (inner wall) of the vacuum tank. With DLC powder adhering to the surfaces of both of the vacuum tank and the container which act as a pair of electrodes, and to the surface of the vacuum tank in particular, which should be maintained at a reference potential, the function of the vacuum tank as an electrode is degraded, leading to instability of the plasma. By employing the DC power supplying step, electrons in the plasma are sucked into the gas introducing pipe functioning as an anode electrode, as described above, whereby the generation of plasma is maintained, leading to the stability of the plasma.

The DLC powder producing step may include a magnetic field forming step for forming a magnetic field in the vacuum tank to confine the plasma within the container. The employment of the magnetic field forming step increases the plasma density in the container, leading to further improvement of the efficiency of producing DLC powder adhering to the inner wall of the container.

The converting step may include a conversion environment forming step for evacuating the vacuum tank or placing the vacuum tank in an inert gas atmosphere, and a heating step for heating the DLC powder at a temperature of from 700° C. to 2,000° C. in the vacuum tank which has evacuated or placed in the inert gas atmosphere. Experiments made by the inventors have proved that the DLC is converted to OLC when heated at a temperature of 700° C. or higher. It has also been found that the efficiency of conversion of DLC powder to OLC is improved as the temperature at which DLC powder is heated is higher. The DLC powder may be heated by using a heater, infrared heating, high-frequency induction heating, electron beam radiation heating, plasma heating or the like. The DLC powder may be heated in the above-described container, or after being transferred to another container. It should be noted here that, if oxygen is present in the vacuum tank when the DLC powder is heated, for example, the DLC powder is oxidized or, in other words, gasified into carbon oxide (CO), carbon dioxide ($CO_2$), or the like. To avoid this inconvenience, the conversion environment forming step is carried out prior to the heating step to evacuate the vacuum tank or place it in an inert gas atmosphere.

The second invention is an invention of a method corresponding to the first invention, and includes DLC powder producing means for producing DLC powder by a plasma CVD processing using a hydrocarbon gas as a material gas, and converting means for converting the DLC powder produced by the DLC powder producing means to onion-like carbon by heating the DLC powder in a vacuum or in an inert gas atmosphere.

In the second invention, too, acetylene gas is the most suitable as the hydrocarbon gas.

A specific structure of the second invention includes a vacuum tank connected to a reference potential and an open-mouthed container disposed within the vacuum tank. The DLC powder producing means of such specific structure includes plasma generating means, gas introducing means and temperature control means, which are described hereinafter. The plasma generating means generates plasma in the vacuum tank with the container disposed therein, by applying AC discharging power to the vacuum tank and the container used a pair of electrodes. The gas introducing means introduces the hydrocarbon gas into the vacuum tank. Further, the temperature control means controls the temperature in the container so that it does not rise above 300° C.

The gas introducing means may include a gas introducing pipe which is insulated from the vacuum tank. The hydrocarbon gas is introduced into the vacuum tank through the gas introducing pipe. The gas introducing pipe has its hydrocarbon gas outlet port, from which the hydrocarbon gas is introduced into the vacuum tank, disposed near the mouth of the container. In this case, the DLC powder producing means may include DC power supplying means for supplying the gas introducing pipe with DC power at a positive potential referenced to reference potential.

Further, the DLC powder producing means may include magnetic field forming means for forming a magnetic field in the vacuum tank to confine the plasma within the container.

The converting means may include conversion environment forming means to evacuate the vacuum tank or place the vacuum tank in an inert gas atmosphere, and heating means heating the DLC powder in the vacuum tank which has been evacuated or placed in an inert gas atmosphere, at a temperature of from 700° C. to 2,000° C.

EMBODIMENT TO CARRY OUT THE INVENTION

One embodiment of the present invention is described hereinunder.

Figure 1:
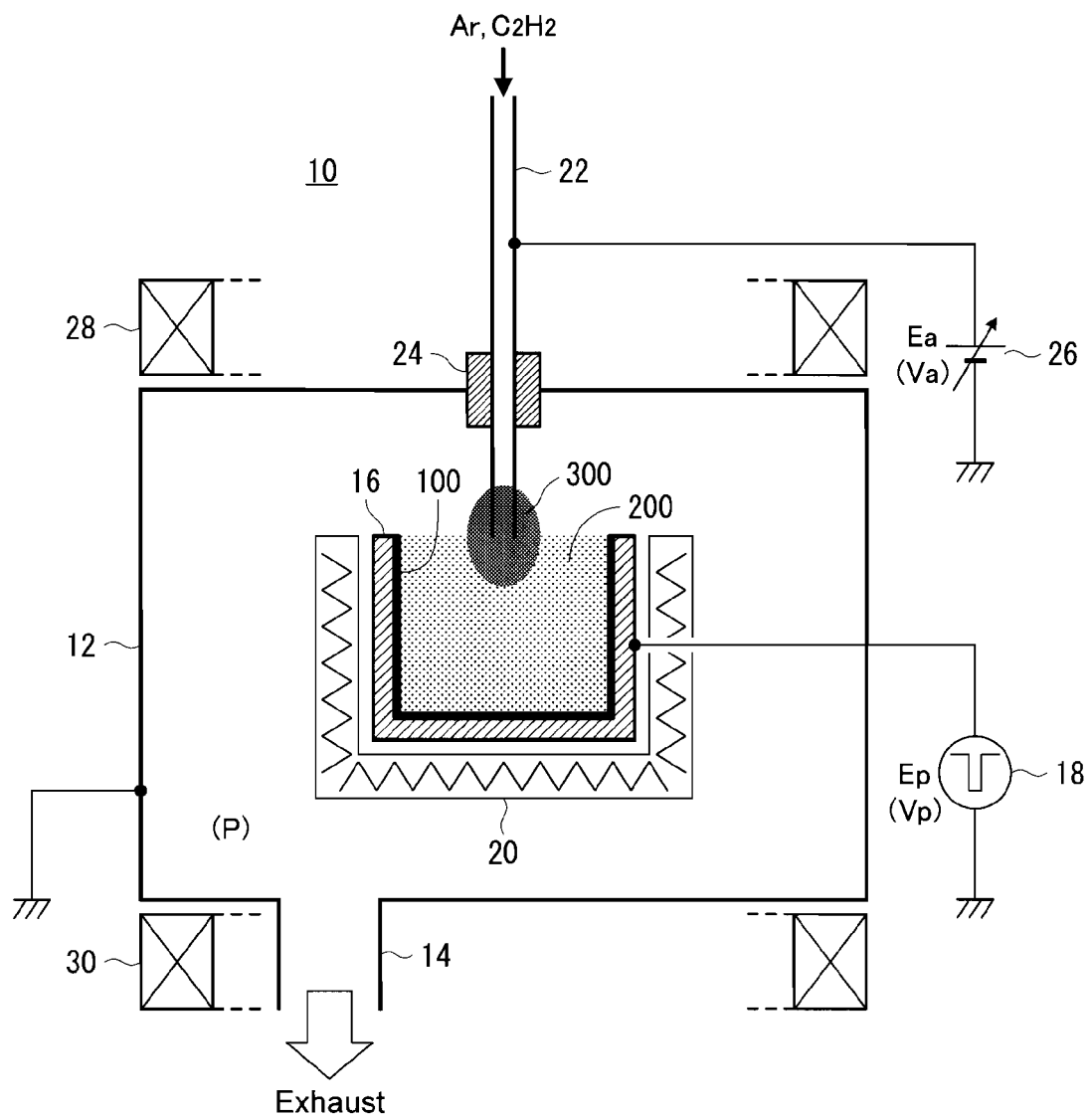
FIG. 1 shows a schematic structure of an OLC manufacturing system according to an embodiment of the present invention.

As shown in FIG. 1, an OLC manufacturing system 10 according to an embodiment of the present invention includes a generally cylindrical vacuum tank 12 having its two ends closed. The vacuum tank 12 is disposed with its one end portion being a top wall and with the other end being a bottom wall. The diameter of the inner space of the vacuum tank 12 is about 1,100 mm, and the height is about 1,000 mm. The shape and dimensions of the vacuum tank 12 are only an example, and can be appropriately determined. The vacuum tank 12 is made of a metal, e.g. SUS 304 stainless steel, having high corrosion resistance and high heat resistance. The wall of the vacuum tank 12 is connected to the ground potential which serves as a reference potential.

An exhaust port 14 is formed in the vacuum tank 12 at an appropriate portion in the wall, e.g. at a position slightly outward (leftward in FIG. 1) of the center of the bottom wall. A vacuum pump (not shown) disposed external to the vacuum tank 12 is connected to the exhaust port 14 through an exhaust pipe (not shown). The vacuum pump serves as exhausting means. The vacuum pump further serves as pressure control means for controlling the pressure P within the vacuum tank 12. In addition, a valve (not shown) is disposed in the exhaust pipe, and functions as pressure control means, too.

At a generally central portion of the vacuum tank 12, a container or crucible 16 is disposed. The crucible 16 is generally cylindrical in shape, with one end open-mouthed and with the other end closed, and disposed with the open-mouthed end facing upward. The crucible 16 has an outer diameter of about 300 mm, and a height of about 300 mm, and the thicknesses of the side and bottom walls thereof are both about 1 mm (or several millimeters). The material of the crucible 16 is a high melting point material, which is also electrically conductive and non-magnetic, and exhibits low adherence to later-mentioned OLC powder 100. An example of the material of the crucible 16 is molybdenum (Mo). Needless to say, the material for the crucible 16 is not limited to molybdenum, and other high melting point material, such as tantalum (Ta), tungsten (W), and graphite (C), can be used. The shape and dimensions of the crucible 16 can be appropriately determined. The shape, in particular, is not limited to a generally cylindrical shape, but other open-mouthed crucible, such as a rectangular shaped crucible and a dish shape crucible, may be used.

Asymmetrical pulse discharging power Ep is supplied to the crucible 16 from a pulse power supply 18 disposed external to the vacuum tank 12. The pulse power supply 18 acts as discharging power supplying means. Specifically, the asymmetrical pulse power Ep is applied between the vacuum tank 12 acting as an anode electrode and the crucible 16 acting as a cathode electrode. The voltage of the asymmetrical pulse power Ep has a rectangular waveform having a higher level voltage value fixed to +37 V and having a lower level voltage value of equal to or more negative than −37 V. The frequency of this voltage can be adjusted as desired within a range of from 10 KHz to 500 KHz through the pulse power supply 18. Also, the duty ratio and the lower level voltage value of this rectangular voltage can be adjusted as desired through the pulse power supply 18. By adjusting the duty ratio and the lower level voltage value, more specifically, by adjusting the duty ratio to a value 50% or lower and adjusting the lower level voltage value to a value within a range of from −37 V to −2,000 V, the average voltage value (converted DC value) Vp of the rectangular voltage can be adjusted as desired to a value within a range of from 0 V to −1,000 V.

Around the (side and bottom walls of) crucible 16, a generally cylindrical heater 20 of a size slightly larger than the crucible 16 is disposed. The heater 20 is heated when heater energizing power is supplied thereto from a heater power supply (not shown) disposed external to the vacuum tank 12. The heater 20 controllably heats the crucible 16, or more specifically the inner wall of the crucible 16, to a desired temperature within a range of from 100° C. to 2,000° C.

A gas introducing pipe 22 extends through an appropriate portion of the wall, e.g. the top wall, of the vacuum tank 12. The gas introducing pipe 22 is made of a high melting point metal, such as molybdenum and tantalum, and is insulated from the vacuum tank 12 by means of an insulator 24. The tip end, or more specifically, the inner end in the vacuum tank 12, of the gas introducing pipe 22 is located substantially at the center of the mouth of the crucible 16. The proximal end of the gas introducing pipe 22 is coupled to a discharge gas supplying source, e.g. an argon (Ar) gas supplying source (not shown) and to a material gas supplying source, e.g. an acetylene gas supplying source (not shown), which are disposed external to the vacuum tank 12. Mass flow controllers (not shown) serving as flow rate controlling means for individually controlling the flow rates of the argon and acetylene gases flowing through the gas introducing pipe 22, and on-off valves (not shown) serving as on-off means for individually turning on and off the flows of the argon and acetylene gases, are provided at locations on the gas introducing pipe 22 outside the vacuum tank 12.

DC power Ea at a positive potential referenced to ground potential is coupled to a nozzle power supply device 26 serving as DC power supply means disposed outside the vacuum tank 12. The voltage value Va of the DC power Ea can be adjusted through the nozzle power supply device 26 to a desired value within a range of from, for example, +10 V to +100 V.

Further, a pair of electromagnetic coils 28 and 30 serving as magnetic field forming means are disposed to extend respectively along the peripheries of the top and bottom walls of the vacuum tank 12. The electromagnetic coils 28 and 30 are supplied with DC magnetic field forming power from a magnetic field forming power supply (not shown) disposed external to the vacuum tank 12, to thereby form what is called a mirror magnetic field in the vacuum tank 12 for confining later-mentioned plasma 200 in the central part of the vacuum tank 12 or, preferably, confine the plasma within the crucible 16. The intensity of the mirror magnetic field is adjustable so as to realize a value within a range of from 1 mT to 10 mT within the crucible 16.

Using the OLC manufacturing system 10 of the above-described arrangement, OLC can be manufactured, using acetylene as a starting material.

Figure 2:
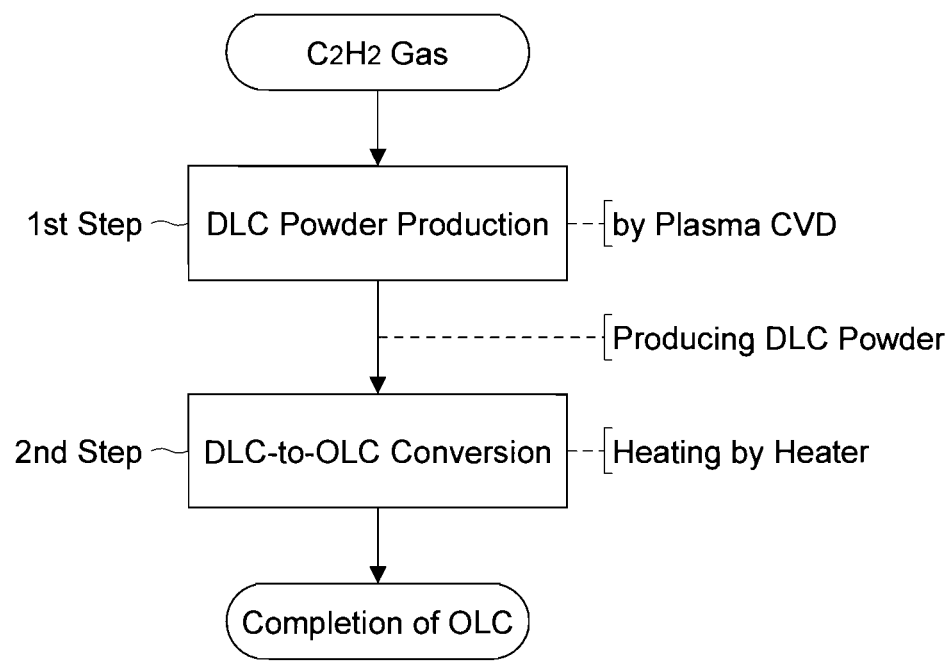
FIG. 2 is a flow chart of the OLC manufacturing process according to the embodiment shown in FIG. 1.

Specifically, as shown in FIG. 2, DLC powder producing processing is carried out as the first step. In the DLC powder producing step, DLC powder 100 is produced by plasma CVD, using acetylene gas as a material gas. After that, DLC-to-OLC converting processing is performed as a second step. In this DLC-to-OLC converting processing, the DLC powder 100 produced in the preceding DLC powder producing processing is heated in an argon gas atmosphere by means of the heater 20. The heating causes the DLC powder to be converted to OLC. In this manner, OLC is completed. Although not shown in FIG. 2, prior to the first, DLC powder producing processing step, evacuation is performed as a pretreatment, and after the second, converting processing step, post-treatment for taking the ultimately manufactured OLC out of the vacuum tank 12 is performed.

In the pretreatment evacuation, the vacuum tank 12 is exhausted of air by the vacuum pump until the pressure P within the vacuum tank 12 becomes $2 \times 10^{-3}$ Pa or lower, preferably, $5 \times 10^{-4}$ Pa or lower.

After the evacuation, the DLC producing processing as the first step is carried out. Argon gas is introduced into the vacuum tank 12 through the gas introducing pipe 22. In this state, the asymmetrical pulse power Ep is applied from the pulse power supply 18, using the vacuum tank 12 as an anode electrode and using the crucible 16 as a cathode electrode. This causes a discharge to be generated in the argon gas in the vacuum tank 12, whereby plasma 200 is generated in the vacuum tank 12. Then, acetylene gas is introduced into the vacuum tank 12 through the gas introducing pipe 22. The acetylene gas is then decomposed by the plasma 200, resulting in production of carbon ions, or decomposition particles of the acetylene gas. The carbon ions impinge on the surfaces of the crucible 16, acting as the cathode electrode, and on the inner wall of the crucible 16 in particular. In this manner, DLC powder is produced on the inner wall of the crucible 16. Since the tip end of the gas introducing pipe 22 is located substantially at the center of the mouth of the crucible 16, the acetylene gas jetting out through the tip end of the gas introducing pipe 22 is introduced directly into the crucible 16. This arrangement aids the improvement of the efficiency of production, e.g. production rate, of DLC powder on the inner wall of the crucible 16.

The production of DLC powder 100 is considered to be a result of simultaneous occurrence of the following two processes. One is formation of a coating of DLC on the inner wall surface of the crucible 16, which coating peels off from the inner wall of the crucible 16 due to its own internal stress, resulting in the production of the DLC powder 100. The other is a result of recombination in a gaseous phase of the carbon radicals and carbon ions which are particles resulting from the decomposition of acetylene gas caused by the plasma 200. This results in the deposition of the DLC powder 100 on the inner wall of the crucible 16. It is considered that the simultaneous occurrence of the two processes produces the DLC powder.

In addition, during this DLC powder producing processing, magnetic field forming power is supplied to the electromagnetic coils 28 and 30. This causes the above-mentioned mirror magnetic field to be formed, which confine the plasma 200 within the crucible 16. As a result, the density of the plasma 200 increases, which further increases the production rate of the DLC powder on the inner wall of the crucible 16.

Additionally, DC power Ea is supplied to the gas introducing pipe 22 from the nozzle power supply 26, which makes the gas introducing pipe 22 serve as a second anode electrode. Electrons in the plasma 200 are drawn into the gas introducing pipe 22 serving as the second anode electrode. As a result, a high-density discharge, i.e. so-called hollow-anode discharge 300, is generated around the gas introducing pipe 22, and around the tip end of the gas introducing pipe 22 in particular. The hollow-anode discharge 300 increases the acetylene gas decomposition efficiency, which leads to further improvement of the production rate of the DLC powder 100 on the inner wall of the crucible 16.

Also, the functioning of the gas introducing pipe 22 as a second anode electrode can stabilize the plasma 200. As described above, the plasma 200 is generated by the application of the asymmetrical pulse power Ep to the vacuum tank 12 acting as an anode electrode and to the crucible 16 acting as a cathode electrode. The DLC powder 100 produced by the use of the plasma 200 is deposited not only on the inner wall (surface) of the crucible 16 but also on the inner wall (surface) of the vacuum tank 12. When the DLC powder 100 adheres to both the surface of the vacuum tank 12 acting as the anode electrode and the surface of the crucible 16 acting as the cathode electrode, and, in particular, when the DLC powder 100 adheres to the surface of the vacuum tank 12 acting as the anode electrode which is to be maintained at the ground potential, the performance as the anode electrode of the vacuum tank 12 is degraded, resulting in instability of the plasma 200. However, since electrons in the plasma 200 are pulled into the gas introducing pipe 22 functioning as the second anode electrode as described above, or, in other words, since the gas introducing pipe 22 functions also as the electrode for generating the plasma 200, the generation of the plasma 200 is sustained, and the plasma 200 is stabilized. The stabilization of the plasma 200 makes it possible to produce the DLC powder 100 for a long time, which means mass production of the DLC powder 100 is available, leading to mass production of OLC, the ultimate product.

Figure 3:
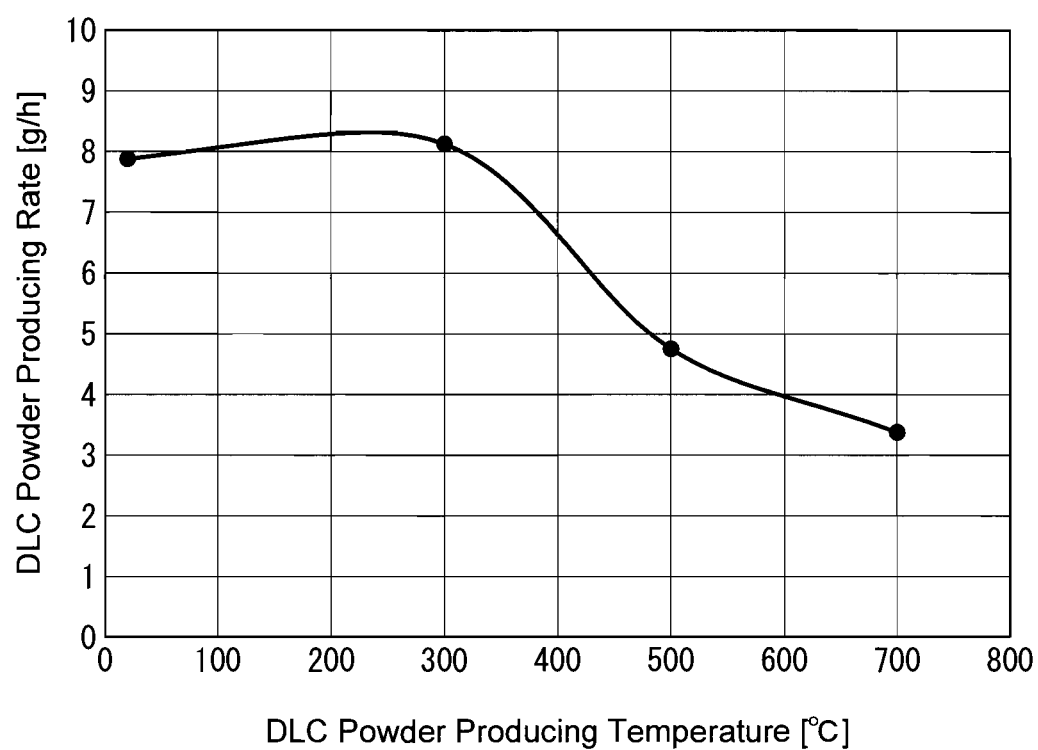
FIG. 3 is a graph showing the relationship between the DLC powder producing temperature and rate in the DLC producing processing in the embodiment shown in FIG. 1.

The heater 20 is supplied with heating electric power so that the heater 20 becomes heated, whereby the temperature of the inner wall of the crucible 16 and, thus, the temperature at which the DLC powder 100 is produced, are controlled. It should be noted that, when the temperature at which the DLC powder 100 is produced is too high, the hydrogen radicals and the hydrogen ions, which are particles resulting from the decomposition of the acetylene gas by the plasma 200, react with the DLC powder 100 to gasify the DLC powder 100. This may lower the rate of production of the DLC powder 100. FIG. 3 shows relationship between the temperature and the rate, at which the DLC powder 100 is produced. The relationship shown in FIG. 3 is the result of actual measurements, under the condition that the flow rate of the argon gas was 50 ml/min., the flow rate of the acetylene gas was 300 ml/min., the pressure P in the vacuum tank 12 was 3 Pa, the frequency of the asymmetrical pulse power Ep was 100 KHz, the duty ratio of the asymmetrical pulse power Ep was 30%, the average voltage value of the asymmetrical pulse power Ep was −500 V, the voltage value Va of the DC power Ea was +30 V, and the magnetic field in the crucible 16 was 5 mT.

As is understood from FIG. 3, the DLC powder producing rate is about 8 g/h when the DLC powder producing temperature is about 300° C. or lower, and such rate may be a rate which enables mass production. However, when the DLC powder producing temperature exceeds 300° C., the rate of producing the DLC powder 100 abruptly decreases greatly. Particularly, when the DLC powder producing temperature is 700° C., the DLC powder producing rate is 3.4 g/h, which is less than half the rate available when the temperature is lower than 300° C. Thus, it is important that the temperature at which the DLC powder 100 is to be produced be controlled to a temperature equal to or lower than 300° C., preferably to a temperature in a range of from 100° C. to 300° C.

Following the first, DLC powder producing processing step carried out in the above-described manner, the second, DLC-to-OLC converting processing step is carried out. Specifically, the supply of the magnetic field forming power to the magnetic coils 28 and 30 is stopped. At the same time, the supply of the DC power Ea to the gas introducing pipe 22 and the supply of the asymmetrical pulse power Ep to the crucible 16 are also stopped. Further, the introduction of argon and acetylene gasses into the vacuum tank 12 through the gas introducing pipe 22 is stopped. The supply of the heater energizing power to the heater 20 may or may not be stopped. After that, the vacuum tank 12 is evacuated anew.

After this additional evacuation, argon gas only is introduced through the gas introducing pipe 22 into the vacuum tank 12. The introduced argon gas changes the interior of the vacuum tank 12 to an argon gas atmosphere. The pressure P within the vacuum tank 12 is 10 Pa, for example. Then, the heater 20 is used to heat the inner wall of the crucible 16 to 1,600° C. This causes the DLC powder 100 in the crucible 16 to be converted to OLC. The DLC-to-OLC converting processing is continued for 30 minutes, for example. Following the DLC-to-OLC converting processing, a post-treatment for taking the finished OLC out of the vacuum tank 12 is carried out.

More specifically, the following post-treatment is done. The supply of the heater energizing power to the heater 20 is stopped, and at the same time, the supply of argon gas to the vacuum tank 12 through the gas introducing pipe 22 is stopped. Also, the pressure P in the vacuum tank 12 is gradually returned to a level almost the same as the atmospheric pressure. After an appropriate cooling time of, for example, from 10 minutes to 30 minutes, the interior of the vacuum tank 12 is opened to the air. After that, the crucible 16 with the finished OLC therein are taken out of the vacuum tank 12. This completes a series of post-treatment processing and, accordingly, the OLC producing processing including the post-treatment. The OLC in the taken-out crucible 16 is collected by means of proper collecting means, e.g. a brush.

Figure 4:
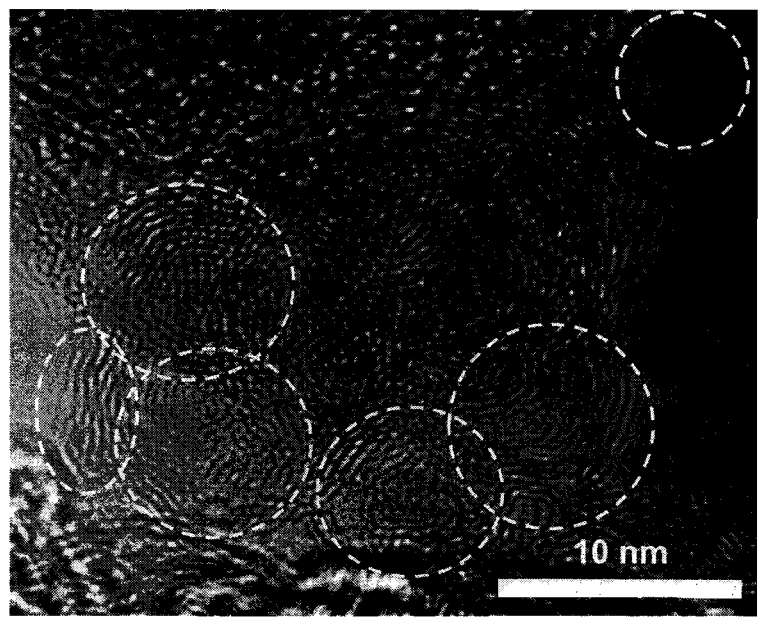
FIG. 4 is an example of pictures taken with an electronic microscope of the OLC manufactured according to the embodiment shown in FIG. 1.

FIG. 4 is a picture of the thus manufactured OLC taken by observing it through a transmission electron microscope (TEM). In FIG. 4, what are encircled with white broken lines are OLC. Thus, it is seen from FIG. 4 that OLC is present. The OLC shown in FIG. 4 was manufactured from the preceding material, i.e. the DLC powder 100 which was produced, with the DLC powder producing temperature of 200° C. employed (in the first step, i.e. the DLC producing processing) and with the same conditions as described with reference to FIG. 3 employed.

Figure 5:
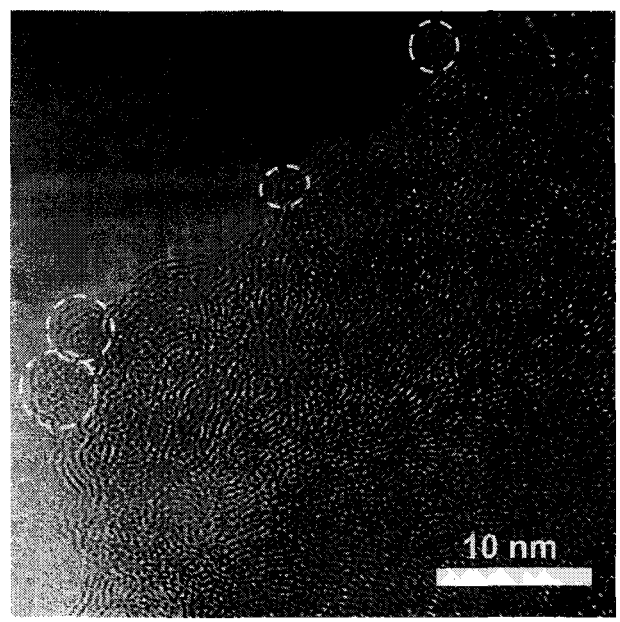
FIG. 5 is an example of pictures taken with an electronic microscope of the DLC powder useable as the material of the OLC manufactured according to the embodiment shown in FIG. 1.

The DLC powder 100, i.e. the preceding material for OLC, too, was observed through a transmission electron microscope, and a picture as shown in FIG. 5 was obtained. In FIG. 5, it is seen that OLC is present in portions encircled with white broken lines. As shown in FIG. 5, it is found that OLC is formed, though it is only in a small amount, in the DLC powder 100. In other words, it has been confirmed that the DLC power 100 can be securely converted to OLC by heating the DLC powder 100 at 1,600° C. (in other words, by carrying out the second step, DLC-to-OLC converting processing).

Figure 6:
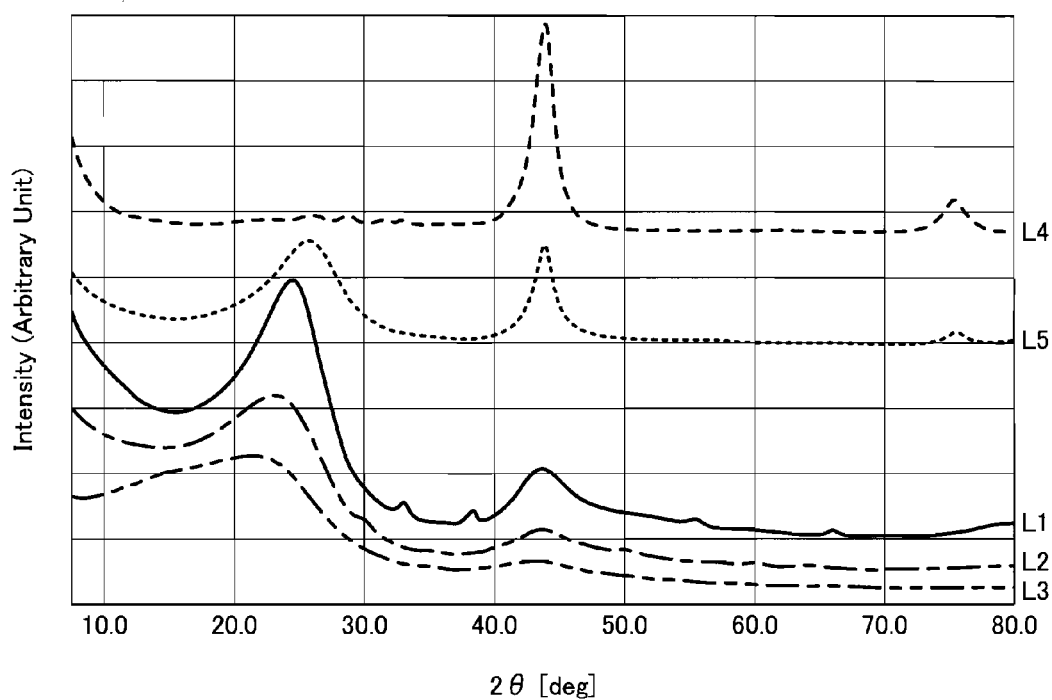
FIG. 6 shows XRD results of the OLC manufactured according to the embodiment shown in FIG. 1 and comparison controls.

OLC's were subjected to X-ray diffraction (XRD) analysis. The results are shown in FIG. 6. In FIG. 6, a solid line curve L1 represents the result of analysis of the OLC manufactured in accordance with the present invention. The other curves L2 through L5 represent the results of analysis of controls. Specifically, the dash and dot line curve L2 represents the result of analysis of OLC obtained by heating the DLC powder 100 at 1,000° C. in the second step, DLC-to-OLC converting processing, and the two dots and dash line curve L3 represents the result of analysis of the DLC powder 100, which is the preceding material. The broken line L4 represents the result of analysis of DNP used as the starting material in the aforementioned prior technology. The dot line curve L5 represents the result of analysis of OLC manufactured by heating the DNP at 1,600° C. in the prior technology.

As is seen from FIG. 6, there is a peak seen around a degree of 43 degrees in each of the curves L1 through L5. The presence of the peak around 43 degrees indicates that diamond components are present. Also, another peak is seen around 26 degrees in the curves L1 through L3 and L5, except the broken line curve L4 which represents the result of analysis of DNP. In particular, the peaks seen around 26 degrees in the curve (solid line curve) L1 representing the result of analysis of the OLC manufactured according to the currently described example of the present invention and the curve (dotted line curve) L5 representing the result of analysis of the OLC made according to the prior technology are prominent. This fact indicates the presence of OLC. Thus, from the results of X-ray diffraction analysis, it is understood that the described embodiment can manufacture OLC.

The peak appearing around 26 degrees in the curve (dotted line curve) L2, which represents the result of analysis of the OLC obtained by heating the DLC powder 100 at 1,000° C., is lower than the one in the curve (solid line curve) L1 which represents the result of analysis of the OLC prepared in accordance with the described embodiment. This means that, although the DLC powder 100 can be converted to OLC by heating the DLC powder 100 at 1,000° C., the conversion efficiency is low, or, in other words, the heating temperature of 1,000° C. cannot securely convert DLC powder 100 to OLC. (That is, the heating temperature of 1,000° C. is too low). The presence of a peak, although it is small, around 26 degrees in the curve (two dots and dash line curve) L3, which represents the result of analysis of DLC powder 100, indicates, as explained previously with reference to FIG. 5, that there is OLC, although small in amount, in the DLC powder 100. The absence of a peak around 26 degrees in the curve (broken line curve) L4, which represents the result of analysis of DNP, indicates that no OLC is present in the DNP.

Figure 7:
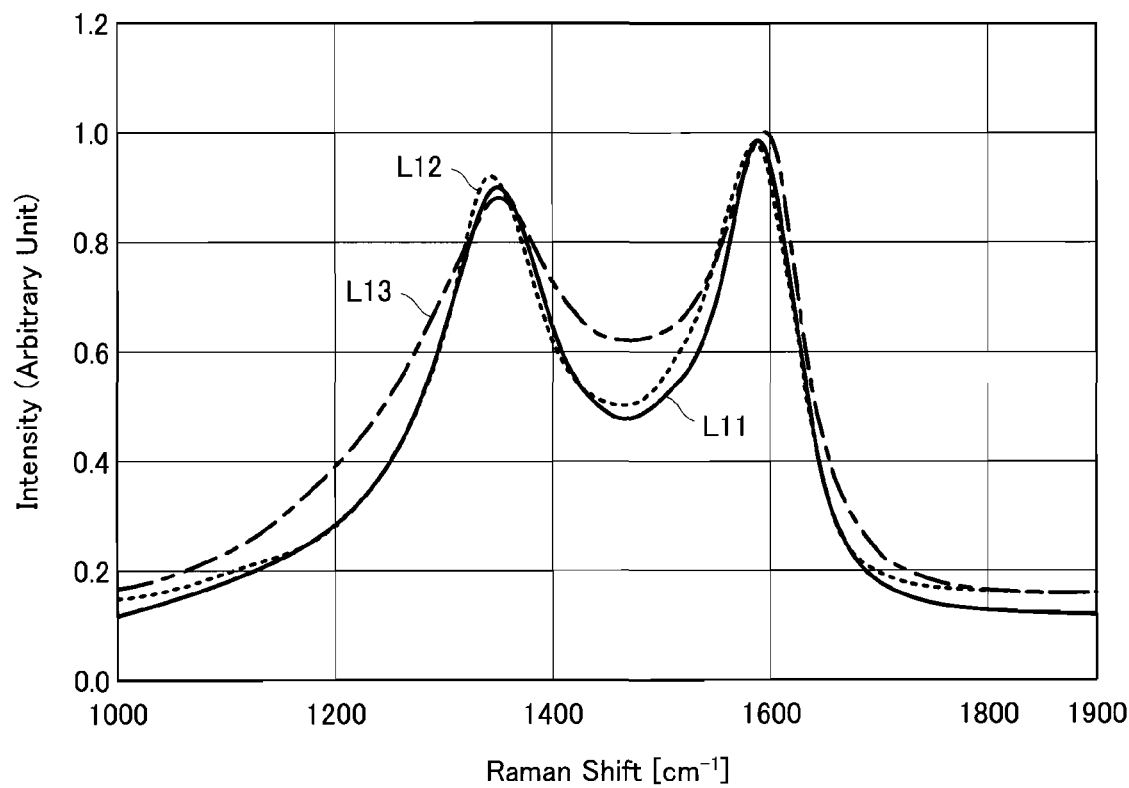
FIG. 7 shows results of Raman spectroscopy of the OLC manufactured according to the embodiment shown in FIG. 1 and comparison controls.

The OLC prepared in accordance with the described embodiment was further analyzed by Raman spectroscopy. The result is shown in FIG. 7. In FIG. 7, a solid line curve L11 represents the result of analysis of the OLC manufactured in accordance with the described embodiment. The other curves L12 and L13 represent the results of analysis of comparison materials. Specifically, the dot and dash line curve L12 shows the result of analysis of the OLC obtained by heating the DLC powder 100 at 1,000° C. in the second, DLC-to-OLC conversion processing step, and the dot line curve L13 shows the result of analysis of the OLC prepared by heating DNP at 1,600° C. in accordance with the prior technology.

As is seen from FIG. 7, the so-called D bands around 1,340 $cm^{-1}$ and the so-called G bands around 1,580 $cm^{-1}$ of the Raman shifts of all of the curves L11 through L13 respectively coincide. In particular, the curve (solid line curve) L11 representing the result of analysis of the OLC prepared in accordance with the described embodiment and the curve (dotted line curve) L13 representing the result of analysis of the OLC prepared in accordance with the prior technology generally coincide with each other over their entire areas including the D and the G bands. This fact also indicates the presence of OLC. It is seen that there is more or less displacement between the curve (dash and dot line curve) L12 representing the result of analysis of the OLC prepared by heating the DLC powder at 1,000° C. and the other curves L11 and L13. This fact indicates that the heating temperature of 1,000° C. cannot satisfactorily convert the DLC powder 100 to OLC.

As described above, according to the described embodiment of the present invention, OLC can be manufactured, using acetylene gas as the starting material. Acetylene gas is much inexpensive than DNP used as the starting material in the above-described prior technology. Accordingly, the described embodiment of the present invention can provide OLC at a significantly lower cost than the prior technology.

Acetylene gas is used in the described embodiment as the starting material, but the present invention is not limited to it. Other hydrocarbon gas, e.g. methane gas, ethylene gas and benzene gas, may be used. A hydrocarbon gas obtained through gasification of alcohol may be employed instead. It has been found by experiments, however, that, when methane gas is used, the rate of producing DLC powder 100 is lower than when acetylene gas is used, or, more specifically, the DLC powder producing rate when methane gas is used is about one-fifth of the rate when acetylene gas is used. It is the same in the case of using ethylene gas. In case of benzene gas, it is necessary to gasify benzene since it is liquid, and therefore an extra cost including a cost for providing gasifying equipment is necessary. In addition, there is a possibility that benzene gas will re-liquefy in the vacuum pump, which may lower the exhaustion efficiency of the vacuum pump. Moreover, benzene gas is toxic and carcinogenic, and therefore the use of benzene gas is harmful. Since alcohol is also liquid, the use of alcohol requires additional costs including a cost for providing gasifying equipment. Considering these factors together, acetylene gas is the most preferable starting material in view of the rate of producing DLC powder 100, the cost, easiness of handling, easiness of procurement, safety etc.

In place of asymmetric pulse power Ep, sine-wave, high-frequency power having a frequency of 13.56 MHz, for example, may be used as the discharging power in the first step, or the DLC powder producing processing. In any case, it is important to use AC power as the discharging power in order to prevent charge-up. It should be noted, however, that, when high-frequency power is used, it is necessary to provide an impedance matching device in order to realize impedance matching between discharging power supplying means for supplying the high-frequency power, or a high-frequency power supply, and a load including the crucible 16, which causes the structure of the system including the impedance matching device to become complicated and also raises the cost of the system as a whole. Also, as described previously, the asymmetric pulse power Ep has its frequency, duty ratio and average voltage value Vp adjustable, and therefore has greater flexibility than high-frequency power to deal with various situations. Thus, the asymmetric pulse power Ep is more preferable to the high-frequency power as the discharging power.

In the described embodiment, a self-discharge excitation (which is also called "cold-cathode type excitation) is employed to excite the plasma 200, but other exciting techniques, for example, high-frequency plasma CVD, microwave plasma CVD, and ECR (Electron Cyclotron Resonance) plasma CVD, hot-cathode PIG (Penning Ionization Gauge) plasma CVD, may be used, instead.

In the described embodiment, a so-called heater heating technique, in which the heater 20 is used to heat the DLC powder 100 in the second step, DLC-to-OLC conversion processing step, but other techniques, e.g. infrared lamp heating, radio-frequency induction heating, electron beam radiation heating, and plasma heating, may be used instead. Whatever heating technique is used, it is important that the DLC powder 100 be heated at a temperature of from 700° C. to 2,000° C., preferably, at a temperature of from 1,600° C. to 2,000° C. Although not mentioned above, experiments conducted have confirmed that the DLC powder 100 can be converted to OLC by employing a heating temperature of at least 700° C. or above. It should be noted, however, that, as described above, as the heating temperature employed is higher, the efficiency of conversion of the DLC powder 100 to OLC is higher. Also, experiments showed that the heating time (i.e. the time period of the DLC-to-OLC converting processing) does not influence much the conversion efficiency, but the heating time of about 20 minutes or longer can assure a certain conversion efficiency (according to the heating time).

It has been described above that the interior of the vacuum tank 12 is an argon gas atmosphere, but the atmosphere is not limited to it. For example, an atmosphere of other inert gas, e.g. neon (Ne) gas and xenon (Xe) gas, may be used. Alternatively, the DLC-to-OLC conversion may be carried out in a vacuum rather than in an inert gas atmosphere.

Also, in the first step, DLC powder producing processing step, an inert gas, e.g. neon gas and xenon gas, may be used as the discharging gas, in place of argon gas.

The first-step DLC powder producing processing and the second-step DLC-to-OLC conversion processing may be carried out in separate apparatuses. In other words, an apparatus for carrying out the DLC powder producing processing and an apparatus for carrying out the DLC-to-OLC conversion processing may be provided separately, and the DLC powder 100 produced in the DLC powder producing processing apparatus is transferred to the DLC-to-OLC conversion processing apparatus where the DLC powder 100 is converted to OLC. Further, the DLC powder producing processing and the DLC-to-OLC conversion processing may be successively carried out in so-called in-line system.

The invention claimed is:

1. A method of manufacturing onion-like carbon, comprising:
   a DLC powder producing step for producing DLC powder by plasma CVD using a hydrocarbon gas as a material gas; and
   a conversion step for converting said DLC powder produced in said DLC powder producing step to onion-like carbon by heating said DLC powder in a vacuum or in an inert gas atmosphere.

2. A method of manufacturing onion-like carbon according to claim 1, wherein said hydrocarbon gas is acetylene gas.

3. A method of manufacturing onion-like carbon according to claim 1, wherein said DLC powder producing step comprises:
   a plasma generating step for generating plasma in a vacuum tank with an open-mouthed container disposed therein by supplying AC discharging power to said vacuum tank, which is connected to a reference potential, and said container, using said vacuum tank and said container as a pair of electrodes;
   a gas introducing step for introducing said hydrocarbon gas into said vacuum tank; and
   a temperature controlling step for controlling a temperature within said container in such a manner that said temperature within said container does not rise above 300° C.

4. A method of manufacturing onion-like carbon according to claim 3, wherein:
   in said gas introducing step, said hydrocarbon gas is introduced into said vacuum tank through a gas introducing pipe insulated from said vacuum tank, a hydrocarbon outlet port of said gas introducing pipe being disposed near the mouth of said container; and
   said DLC powder producing step further comprises a DC power supplying step for supplying positive potential DC power referenced to said reference potential to said gas introducing pipe.

5. A method of manufacturing onion-like carbon according to claim 3, wherein said DLC powder producing step further comprises a magnetic field forming step for forming a magnetic field within said vacuum tank to confine said plasma within said container.

6. A method of manufacturing onion-like carbon according to claim 3, wherein said converting step comprises:
   a conversion environment forming step for placing the interior of said vacuum tank in a vacuum or in said inert gas atmosphere; and
   a heating step for heating said DLC powder at a temperature of from 700° C. to 2,000° C. in said vacuum tank which is in a vacuum or in said inert gas atmosphere.

7. An onion-like carbon manufacturing system comprising:
   DLC powder producing means for producing DLC powder by plasma CVD using a hydrocarbon gas as a material gas; and
   converting means for converting said DLC powder produced by said DLC powder producing means to onion-like carbon by heating said DLC powder in a vacuum or in an inert gas atmosphere.

8. An onion-like carbon manufacturing system according to claim 7, wherein said hydrocarbon gas is acetylene gas.

9. An onion-like carbon manufacturing system according to claim 7, further comprising:
   a vacuum tank connected to a reference potential; and
   an open-mouthed container disposed within said vacuum tank;
   wherein said DLC powder producing means comprises:
   plasma generating means for generating plasma in said vacuum tank with said open-mouthed container disposed therein by supplying AC discharging power to said vacuum tank and said container, using said vacuum tank and said container as a pair of electrodes;
   gas introducing means for introducing said hydrocarbon gas into said vacuum tank; and
   temperature controlling means for controlling a temperature within said container in such a manner that said temperature within said container does not rise above 300° C.

10. An onion-like carbon manufacturing system according to claim 9, wherein:
    said gas introducing means includes a gas introducing pipe insulated from said vacuum tank;
    said hydrocarbon gas is introduced through said gas introducing pipe into said vacuum tank;

said gas introducing pipe is so disposed that a hydrocarbon outlet port of said gas introducing pipe is located near the mouth of said container; and said DLC powder producing means further comprises DC power supplying means for supplying positive potential DC power referenced to said reference potential to said gas introducing pipe.

11. An onion-like carbon manufacturing system according to claim 9, wherein said DLC powder producing step further comprises magnetic field forming means for forming a magnetic field within said vacuum tank to confine said plasma within said container.

12. An onion-like carbon manufacturing system according to claim 9, wherein said converting means includes:
conversion environment forming means for placing the interior of said vacuum tank in a vacuum or in said inert gas atmosphere; and
heating means for heating said DLC powder at a temperature of from 700° C. to 2,000° C. in said vacuum tank which is in a vacuum or in said inert gas atmosphere.

* * * * *